(12) United States Patent
Hirayama et al.

(10) Patent No.: US 6,988,684 B2
(45) Date of Patent: Jan. 24, 2006

(54) HANDLE ASSEMBLY FOR FISHING REEL

(75) Inventors: Hirokazu Hirayama, Sakai (JP);
Kenichi Kawasaki, Sakai (JP);
Tomoharu Sakurai, Wakayama (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/426,784

(22) Filed: May 1, 2003

(65) Prior Publication Data

US 2003/0218088 A1 Nov. 27, 2003

(30) Foreign Application Priority Data

May 9, 2002 (JP) .............................. 2002-134353

(51) Int. Cl.
*A01K 89/01* (2006.01)
(52) U.S. Cl. ........................................ 242/283; 74/575
(58) Field of Classification Search ................ 242/283; 74/545
See application file for complete search history.

(56) References Cited

U.S. PATENT DOCUMENTS

| | | | |
|---|---|---|---|
| 2,035,924 A * | 3/1936 | Schafer ........................ 242/283 |
| 2,251,168 A * | 7/1941 | Ronnick ........................ 74/543 |
| 2,643,131 A * | 6/1953 | King ............................. 242/264 |
| 3,148,913 A * | 9/1964 | Golde ........................... 296/223 |
| 3,727,857 A * | 4/1973 | Chann .......................... 242/229 |
| 3,905,249 A * | 9/1975 | Murvall ........................ 74/543 |
| 4,138,075 A   | 2/1979 | Korten |
| 4,283,025 A * | 8/1981 | Whisenhunt ................. 242/250 |
| 5,328,128 A   | 7/1994 | Morris |
| 5,433,394 A * | 7/1995 | Brozio ......................... 242/283 |
| 5,577,678 A * | 11/1996 | Murayama .................. 242/283 |
| 5,683,050 A   | 11/1997 | Murayama et al. |
| 6,105,891 A   | 8/2000 | Ikuta et al. |
| 6,364,229 B1 * | 4/2002 | Kang ........................... 242/283 |
| 6,626,385 B1 * | 9/2003 | Tsutsumi ..................... 242/282 |

* cited by examiner

*Primary Examiner*—Emmanuel Marcelo
(74) *Attorney, Agent, or Firm*—Shinjyu Global IP Counselors, LLP (57) ABSTRACT

A handle assembly has a handle arm mounted to a fore-end of a handle shaft, a handle grip rotatively mounted to one end of the handle arm, and a rotation support portion made of a metal for rotatively mounting the handle grip to handle arm. The handle grip is a substantially egg-shaped member made of a synthetic resin, and is rotatively provided on the outward side of the rotation support portion. The handle grip is shaped such that the user can grip the whole of the handle grip with his palm. The handle grip also has first through fourth recesses such that the user can grasp the handle grip by attaching the thumb to the third recess, or pinch the handle grip between the thumb and fingertips by placing the thumb and index finger in the first and second recesses. Accordingly, it is possible to conduct high-speed winding easily.

14 Claims, 12 Drawing Sheets

HANDLE ASSEMBLY FOR FISHING REEL

BACKGROUND OF THE INVENTION

1. Field of the Invention

This invention generally relates to handle assemblies. More specifically, the present invention relates to handle assemblies having a handle grip that is shaped such that the whole of the handle is to be gripped with a human palm.

2. Background Information

Fishing reels such as spinning reels and dual-bearing reels are equipped with a handle shaft, which has a handle assembly fixed to the fore-end thereof. The handle assembly has a handle arm mounted to the fore-end of the handle shaft, a rotation support portion fixed to the fore-end of the handle arm, and a handle grip rotatively mounted to the rotation support portion. The contour of the handle grip is formed in such a shape that the whole thereof is grippable with the human palm, for example, such a shape that the contour thereof is substantially egg-shaped or substantially T-shaped.

In the above-described conventional handle assembly, because the contour of the handle grip is formed to be substantially egg shaped or substantially T-shaped, the entire handle grip can be firmly gripped with the human palm when a big fish is caught or when jigging or the like is to be carried out. However, when, for example, the load is light, it is difficult to wind fishing line at high speed while gripping the entire handle grip.

In view of the above, there exists a need for handle assembly which overcomes the above mentioned problems in the prior art. This invention addresses this need in the prior art as well as other needs, which will become apparent to those skilled in the art from this disclosure.

SUMMARY OF THE INVENTION

The purpose of the present invention is to provide a handle assembly having a handle grip, the whole of which is grippable with the human palm, and which allows high-speed winding easily.

A handle assembly according to the first aspect of the present invention is a handle assembly being mounted to a fore-end of a handle shaft of a fishing reel and being equipped with: a handle arm adapted to be mounted to the fore-end of the handle shaft; a rotation support portion rotatably mounted to a fore-end of the handle arm; and a handle grip non-rotatably mounted to the rotation support portion. The handle grip includes a body portion shaped such that a user can hold a whole of the handle grip with a palm, and a recess formed on the body portion such that the user can pinch the handle grip by placing his fingertips on the recess.

In the above-described handle assembly, the body portion of the handle grip is formed to have a shape such that the whole thereof is grippable with the palm, and is recessed with a recess or recesses for being pinched between the thumb and fingertips. Here, when jigging or the like is to be carried out, the entire handle grip can be firmly gripped with the palm. Moreover, when the load is light, for example, it is easy to carry out high-speed winding by pinching the recessed handle grip between the thumb and fingertips.

A handle assembly according to the second aspect of the present invention is the handle assembly as set forth in the first aspect, wherein the handle grip is recessed in the vicinity of the portion thereof to which the rotation support portion is mounted. In this case, the handle grip is recessed in the vicinity of the portion of the handle grip to which the rotation support portion is mounted, in other words, the rotational axis of the handle grip. Therefore, high-speed winding can be carried out by pinching the recessed handle grip between the thumb and fingertips, while the rotation of the hand grip is prevented.

A handle assembly according to the third aspect of the invention is the handle assembly as set forth in the first or second aspect, wherein the handle grip is recessed with recesses formed in a plurality of locations therein. In this case, the handle grip is pinched at the recesses provided in the plurality of locations, and the thumb and fingers can be placed into the hollows of the recesses when the handle grip is gripped.

A handle assembly according to the fourth aspect of the present invention is the handle assembly as set forth in the third aspect, wherein the recesses are formed in locations in the handle grip that form symmetry with respect to the rotational axis of the handle grip. In this case, even when the handle grip rotates, the thumb and fingers can be placed into the recesses that are formed in the locations that form symmetry.

A handle assembly according to the fifth aspect of the present invention is the handle assembly as set forth in any one of the first through fourth aspects, wherein the handle grip is formed such that the contour thereof is substantially egg-shaped. In this case, the entire handle grip is easily gripped.

A handle assembly according to the sixth aspect of the present invention is the handle assembly as set forth in any one of the first through fourth aspect, wherein the handle grip is formed such that a cross sectional shape thereof is substantially T-shaped. In this case, formation of the handle grip is made easy.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
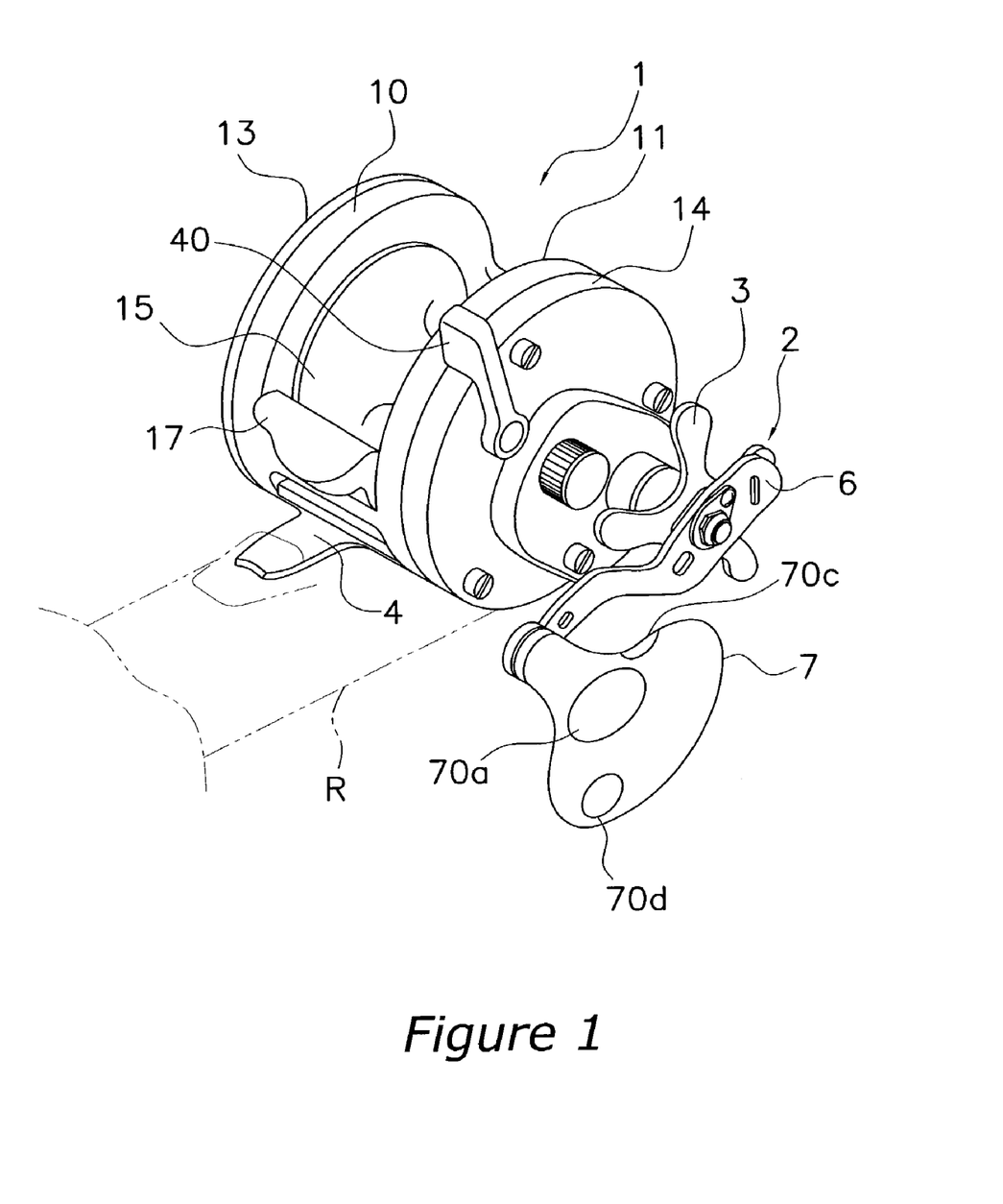
FIG. 1 is a perspective view of a dual-bearing reel in accordance with an embodiment of the present invention.

A dual-bearing reel in which one embodiment of the present invention is adopted is, as shown in FIG. 1, a single handle type round reel that includes a reel unit 1, a handle assembly 2 that is disposed at one side of the reel unit 1 and is for rotating a spool, and a star drag 3 that is disposed at the reel unit 1 side of the handle assembly 2.

Figure 2:
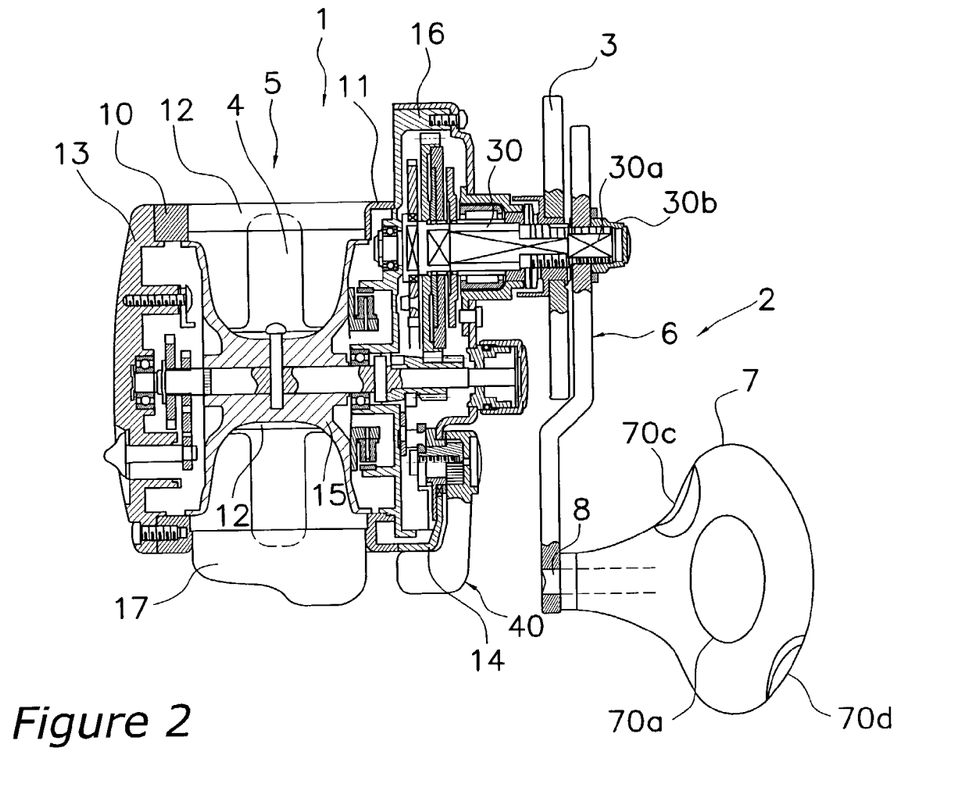
FIG. 2 is a cross-sectional view of the dual-bearing reel in accordance with the embodiment of the present invention.

As shown in FIG. 1, the reel unit 1 is attached to a fishing rod R at a rod-mounting leg 4. The reel unit 1 includes, as shown in FIG. 2, a pair of a first side plate 10 and a second side plate 11 that are disposed on the left and right sides so as to have a predetermined gap therebetween; a frame 5 having a plurality of coupling members 12 for coupling the first side plate 10 and the second side plate 11; a first side cover 13 and a second side cover 14 mounted on opposing sides of the frame 5; and a mechanism fitting plate 16 mounted to the second side cover 14. The mechanism fitting plate 16 is disposed contacting the second side plate 11, and between the mechanism fitting plate 16 and the second side cover 14, a space is formed for accommodating various mechanisms. The reel unit 1 has a spool 15 that is for winding or unwinding fishing line. The spool 15 is rotatively mounted to the first side cover 13 and the second side cover 14 of the reel unit 1. At the rear of the second side cover 14 of the reel unit 1, a clutch lever 40 is pivotably mounted for operating a clutch mechanism (not shown). The clutch mechanism, the clutch lever 40, and the spool 15 are conventional components that are well known in the art. Therefore, these structures will not be discussed or illustrated in detail herein.

Figure 3:
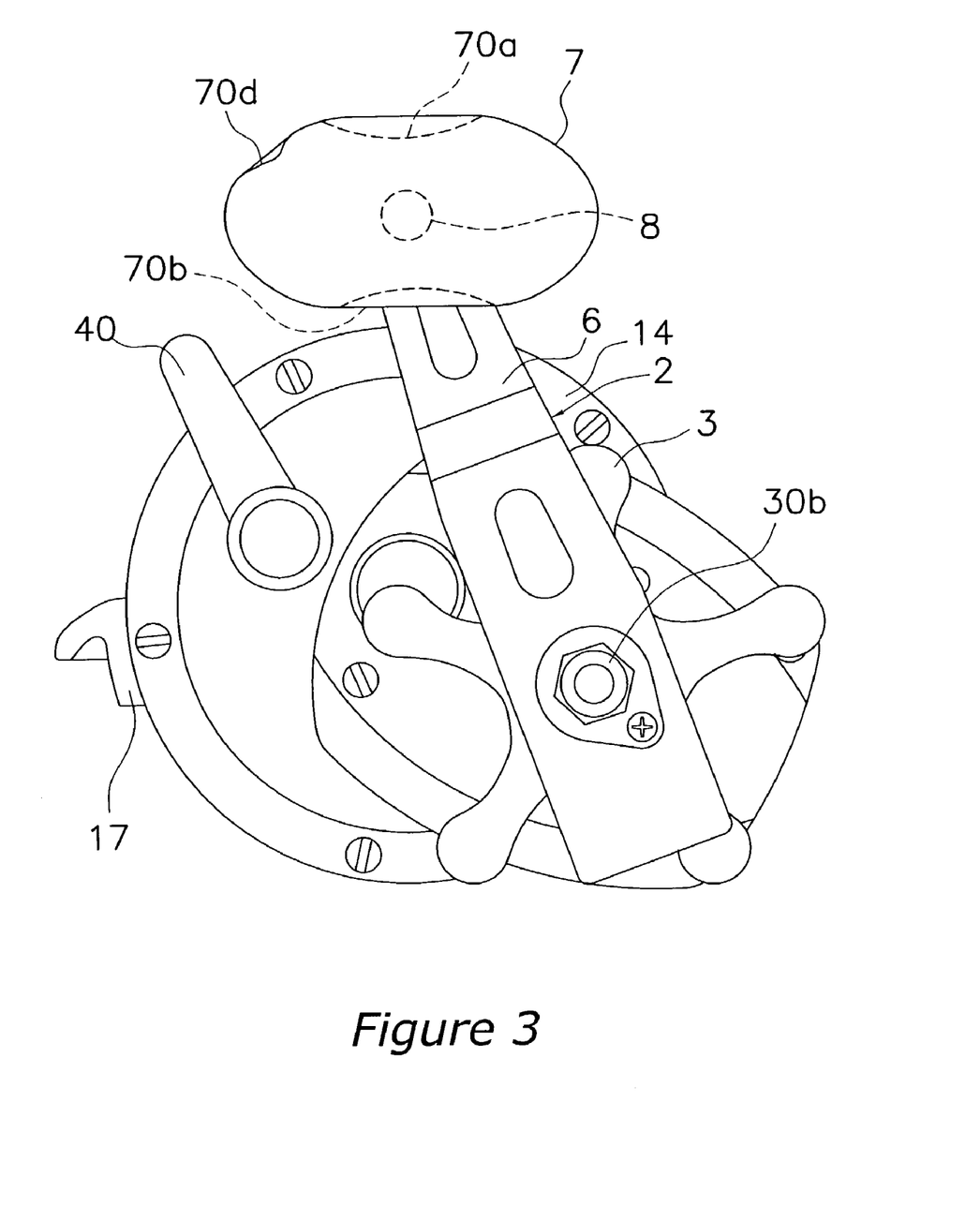
FIG. 3 is a side view of the dual-bearing reel in accordance with the embodiment of the present invention.

The frame 5 is obtained by die-casting, and the second side cover 14 is obtained by press-forming a thin metal plate. The first side plate 10, the second side plate 11, and the first side cover 13 form a circular shape when viewed laterally. Their outer peripheral faces are machined using, for example, a lathe or the like. The second side cover 14 and the mechanism fitting plate 16 have, as shown in FIGS. 2 and 3, a shape such that a part of the circular shape protrudes diametrically when viewed laterally. A portion of the second side cover 14 to which a handle shaft 30 (see FIG. 2) is mounted also protrudes axially outward.

The coupling members 12 are plate-shaped members that are formed in a shape that runs along the outer circumferences of the first side plate 10 and the second side plate 11. The coupling members 12 are mechanically formed so as to constitute a one-piece unitary member with the first side plate 10 and the second side plate 11, coupling the first side plate 10 and the second side plate 11 at, for example, three locations in the reel unit 1, namely, at the rear, the bottom, and the top. The outer circumferences of the coupling members 12 are machined integrally with the first side plate 10 and the second side plate 11, as in the case of the first side cover 13. The rod-mounting leg 4 is fixed to one of the coupling members 12 that is at the bottom, whereas a thumb rest 17 made of a synthetic resin is mounted to another one of the coupling members 12 that is at the rear.

The handle assembly 2 has, as shown in FIGS. 1 through 4, a handle arm 6 non-rotatably mounted to a fore-end of the handle shaft 30 (see FIG. 2); a handle grip 7 rotatively mounted to one end of the handle arm 6; and a rotation support portion 8 (see FIGS. 3 and 4) that is made of a metal and is for rotatively mounting the handle grip 7 to the handle arm 6.

The handle arm 6 is, as shown in FIG. 2, a member made of a metal and having a flat plate shape extending along the radial direction of the handle shaft 30. The handle arm 6 is non-rotatably engaged with the fore-end of the handle shaft 30 that has a noncircular section by forming a chamfered portion 30a, and is detachably fastened to the handle shaft 30 with a fastening nut 30b.

The handle grip 7 is a member made of a synthetic resin and is rotatively provided on the outward side of the rotation support portion 8. The handle grip 7 has a body portion 70 and a first recess 70a to a fourth recess 70d formed on the body portion 70. The body portion 70 has substantially an egg shape as shown in FIGS. 3–7. The contour of the handle grip 7 is formed in such a shape that the whole thereof is grippable with the human palm. At the same time, the handle grip 7 is recessed with a first recess 70a to a fourth recess 70d at respective locations. The first and second recesses 70a and 70b are formed such that the user can pinch the first and second recesses 70a and 70b between his fingertips. The third recess 70c is formed to allow the user's thumb to be attached to it when the user grips or grasps the handle grip 7. The fourth recess 70d is formed to allow the user's thenar eminence to be attached to it when the user grips the handle grip 7 with his palm.

The rotation support portion 8 is made of a metal and, is provided such that the handle grip 7 is rotatively mounted to the handle arm 6. The handle grip 7 is non-rotatable coupled to the rotation support portion 8. Since rotation support portion 8 is well known in the art, detailed explanation of the rotation support portion 8 will be omitted herein.

Figure 4:
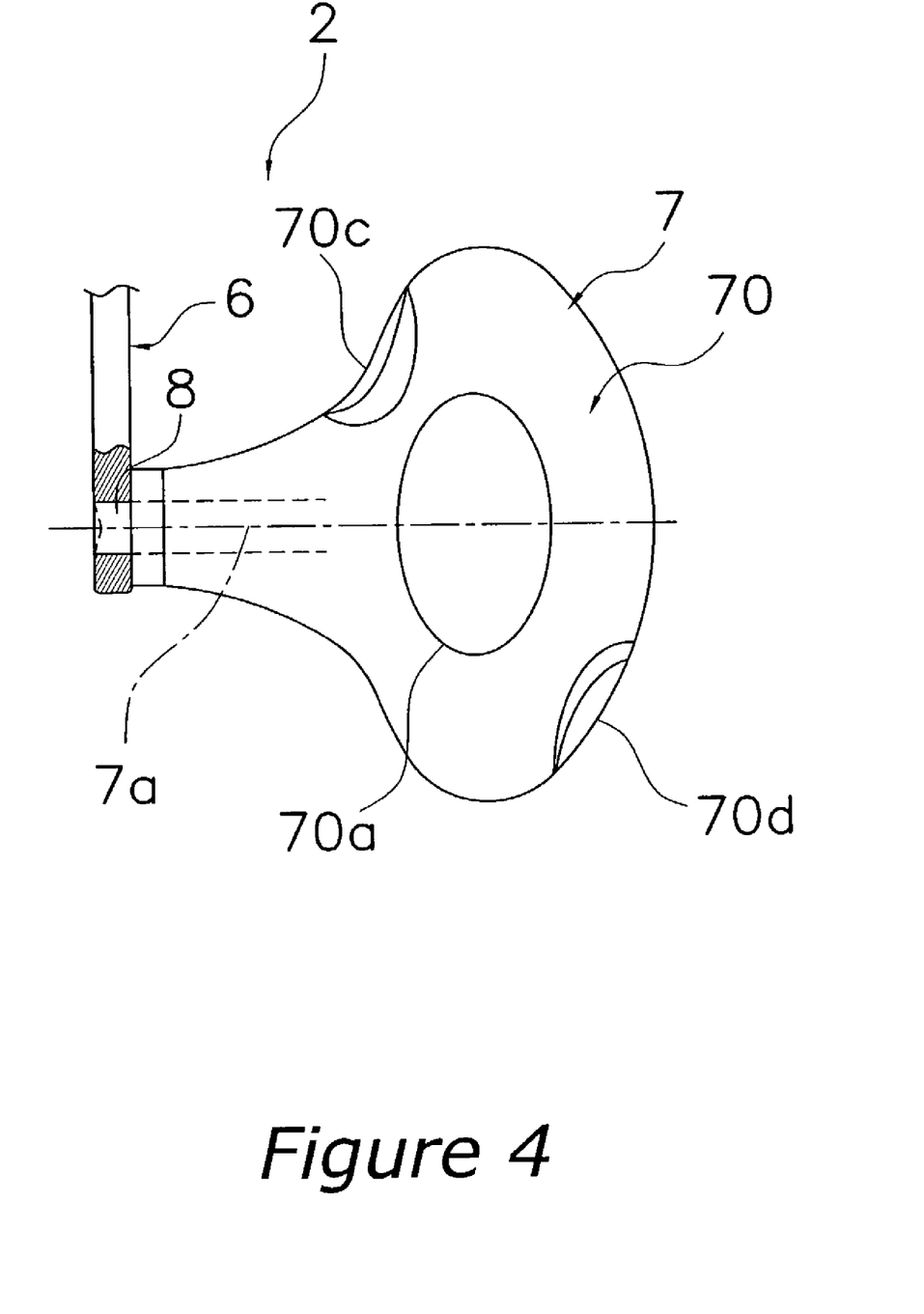
FIG. 4 is an enlarged view of the handle grip in accordance with the embodiment of the present invention.

The first recess 70a and the second recess 70b (see FIG. 3) are, as shown in FIGS. 1 through 4, formed on opposite sides of the contour of the body portion 70. The first recess 70a and the second recess 70b are formed in a middle portion of the handle grip 7 at such locations that they form symmetry with respect to the rotational axis 7a of the handle grip 7. The first and second recesses 70a and 70b are particularly useful when the user wishes to perform high-speed winding, because the user can pinch the handle grip 7 by placing his fingertips on the first and second recesses 70a and 70b. The third recess 70c is, as shown in FIGS. 1, 2, and 4, formed in a constricted portion of the handle grip 7 that faces the handle arm 6. In other words, the third recess 70c is formed on an axial side of the body portion 70 closer to the rotation support portion 8. Also, the third recess 70c is formed on a side of the body portion 70 closer to the user (on a side closer to the viewer in a direction perpendicular to the paper plane of FIGS. 4–7). The fourth recess 70d is, as shown in FIGS. 1 through 4, formed in a location that is outward of the handle grip 7 and is point-symmetrical with the third recess 70c with respect to substantially the center of the egg-shaped handle grip 7. The fourth recess 70d is formed on an axial side of the body portion 70 away from the rotation support portion 8. Also, the fourth recess 70d is formed on a side closer to the user (on a side closer to the viewer in a direction perpendicular to the paper plane of FIGS. 4–7).

The handle grip 7 of this type is designed to be held with a hand in three different ways.

Figure 5:
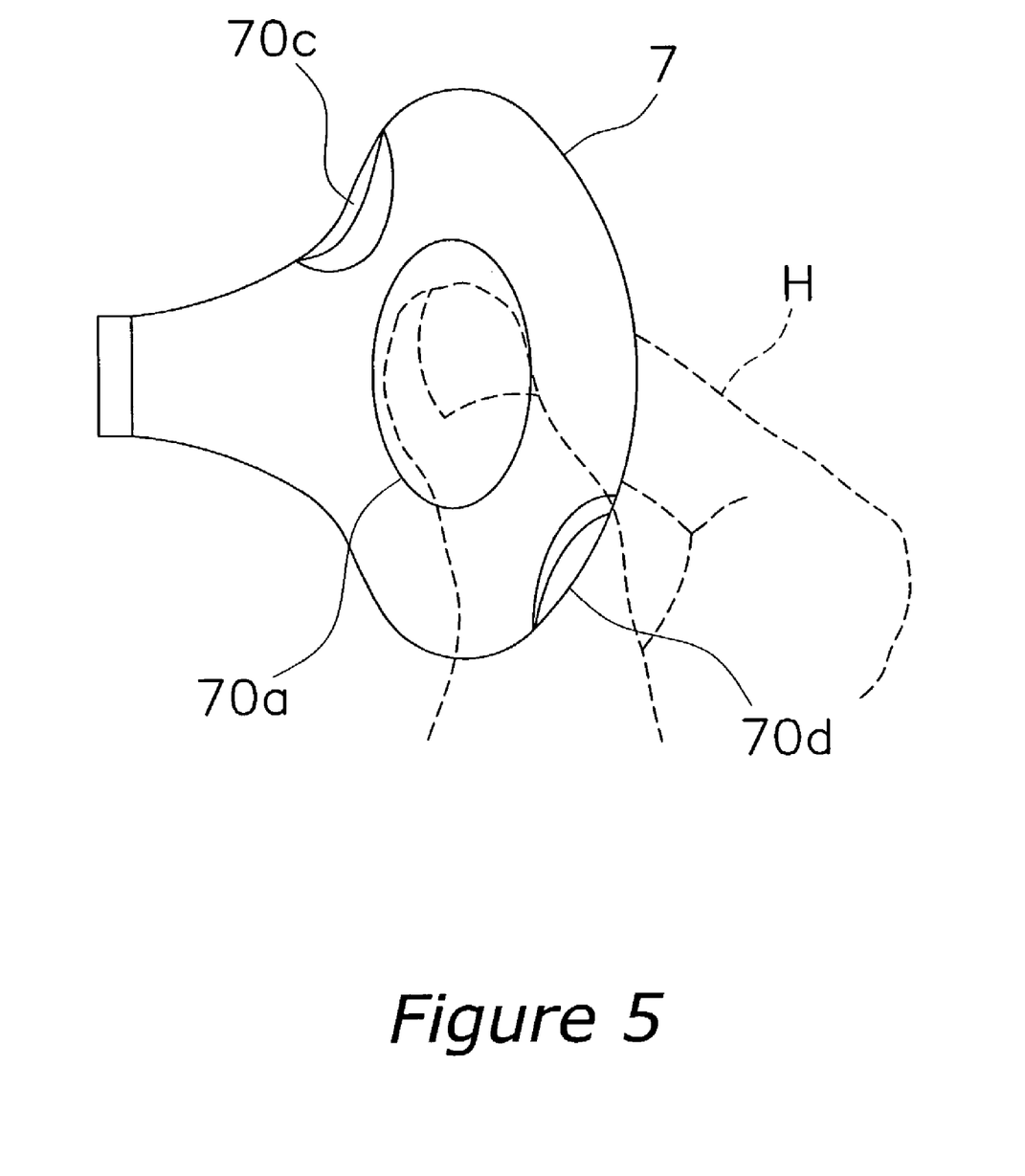
FIG. 5 is an enlarged view of the handle grip in accordance with the embodiment of the present invention, where the handle grip is seized.

As shown in FIG. 5, the handle grip 7 is clamped with the thumb and fingertips. In this case, the thumb and the index finger are respectively placed on the first recess 70a and the second recess 70b, such that the user can apply force to the handle grip 7 through his thumb and index finger. With this manner of holding the handle grip 7, it is possible to rotate the handle at a high-speed when, for example, the load is light.

Figure 6:
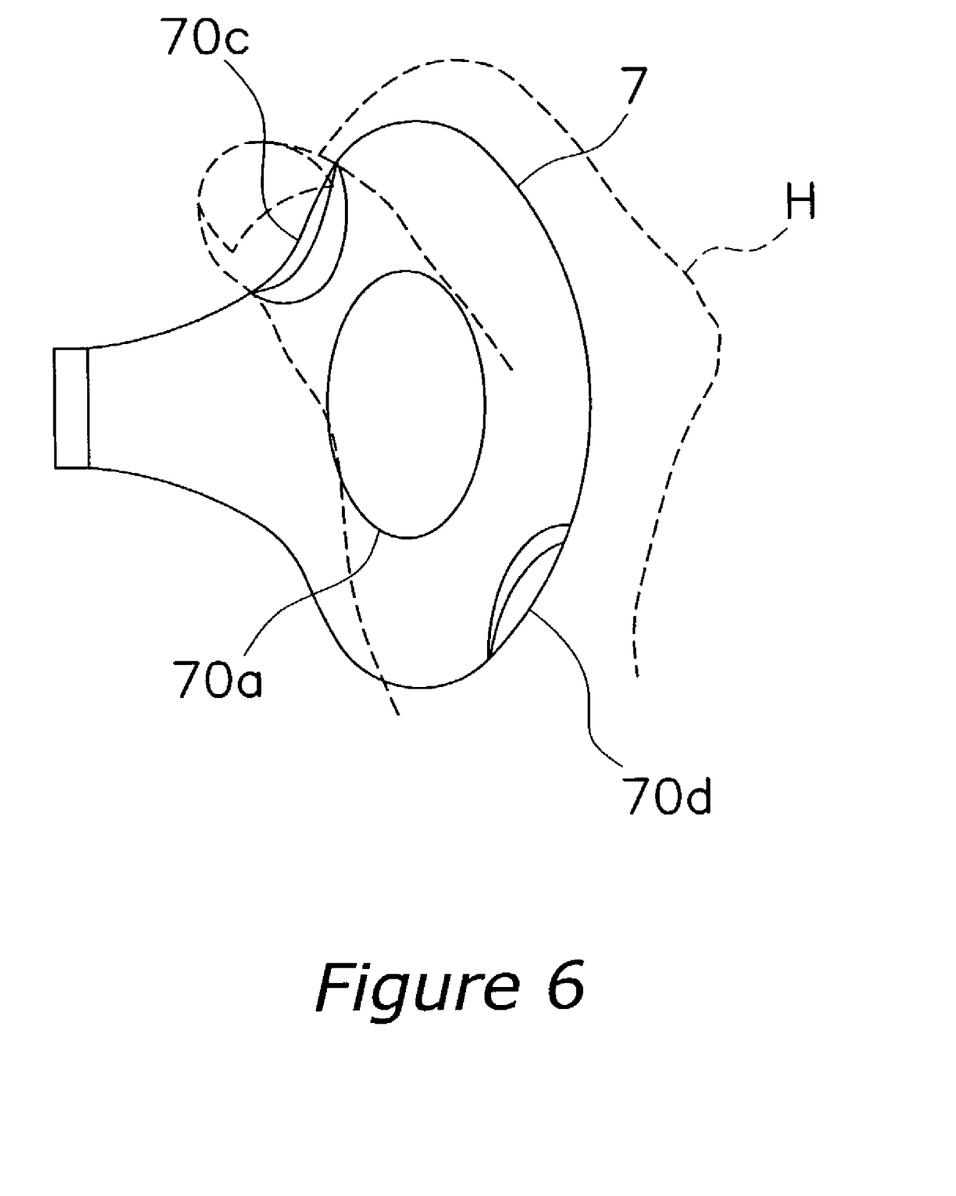
FIG. 6 is an enlarged view of the handle grip in accordance with the embodiment of the present invention, where the handle grip is gripped.

Alternatively, the handle grip 7 can be gripped with palm as shown in FIG. 6. When the handle grip 7 is gripped, the thenar eminence of the user's hand is attached to the fourth recess 70d, such that the user can apply force to the handle grip 7 through the thenar eminence while attaching substantially the entire surface of the palm. This way, the user holds the entire handle grip 7 with his palm. This manner of holding is useful when the user wishes to rotate the handle with a greater force. Since the handle grip 7 has the fourth recess 70d, it is easy for the user to attach his palm to the handle grip 7 to apply force thereto.

Figure 7:
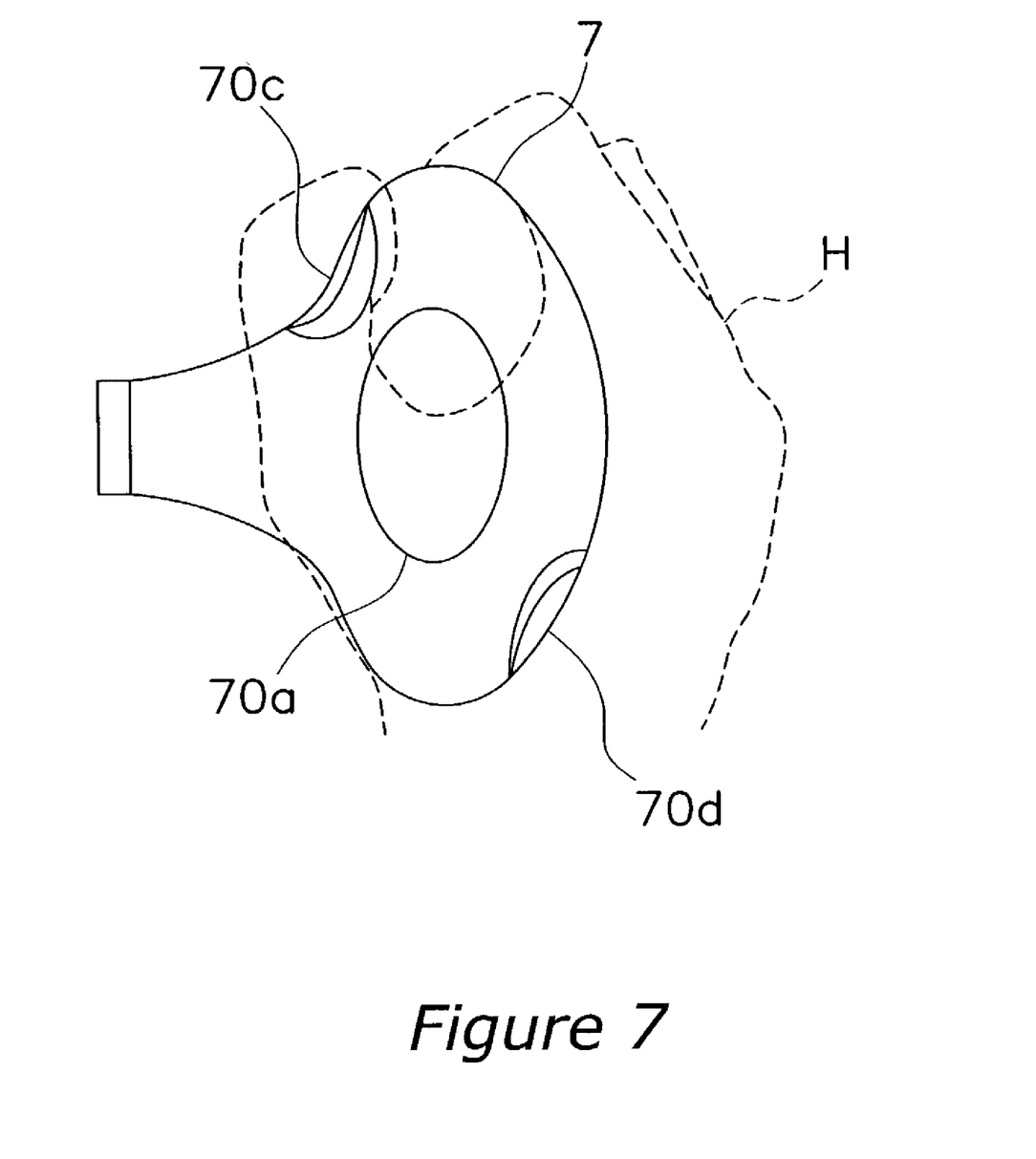
FIG. 7 is an enlarged view of the handle grip in accordance with the embodiment of the present invention, where the handle grip is grasped.

Still alternatively, the handle grip 7 can be grasped with palm as shown in FIG. 7. When the handle grip 7 is grasped, the user's thumb is attached to the third recess 70c, such that the user can apply force through his thumb while attaching substantially the entire surface of the palm. This way, the user holds the entire handle grip 7 with his palm. This manner of holding is useful when the user wishes to rotate the handle with an even greater force. Since the handle grip 7 has the third recess 70c, it is easy for the user to attach his thumb to the handle grip 7 to apply force thereto.

In the handle assembly 2 thus formed, the handle grip 7 is formed in a shape such that the whole thereof is grippable with the human palm, and at the same time is recessed with the first recess 70a and the second recess 70b for being seized between the thumb and fingertips. Here, when jigging or the like is to be carried out, the entire handle grip 7 can be firmly gripped with the human palm. Moreover, when, for example, the load is light, high-speed winding can be easily carried out by seizing the handle grip 7 in the first recess 70a and the second recess 70b with the thumb and fingertips.

Other Embodiments (a) In the foregoing embodiment, a dual-bearing reel is illustrated as an example, but the present invention is not limited thereto and may be applied to any other fishing reels, such as spinning reels. In addition, the present invention may be applied not only to single handle type reels but also to double handle type reels.

Figure 8:
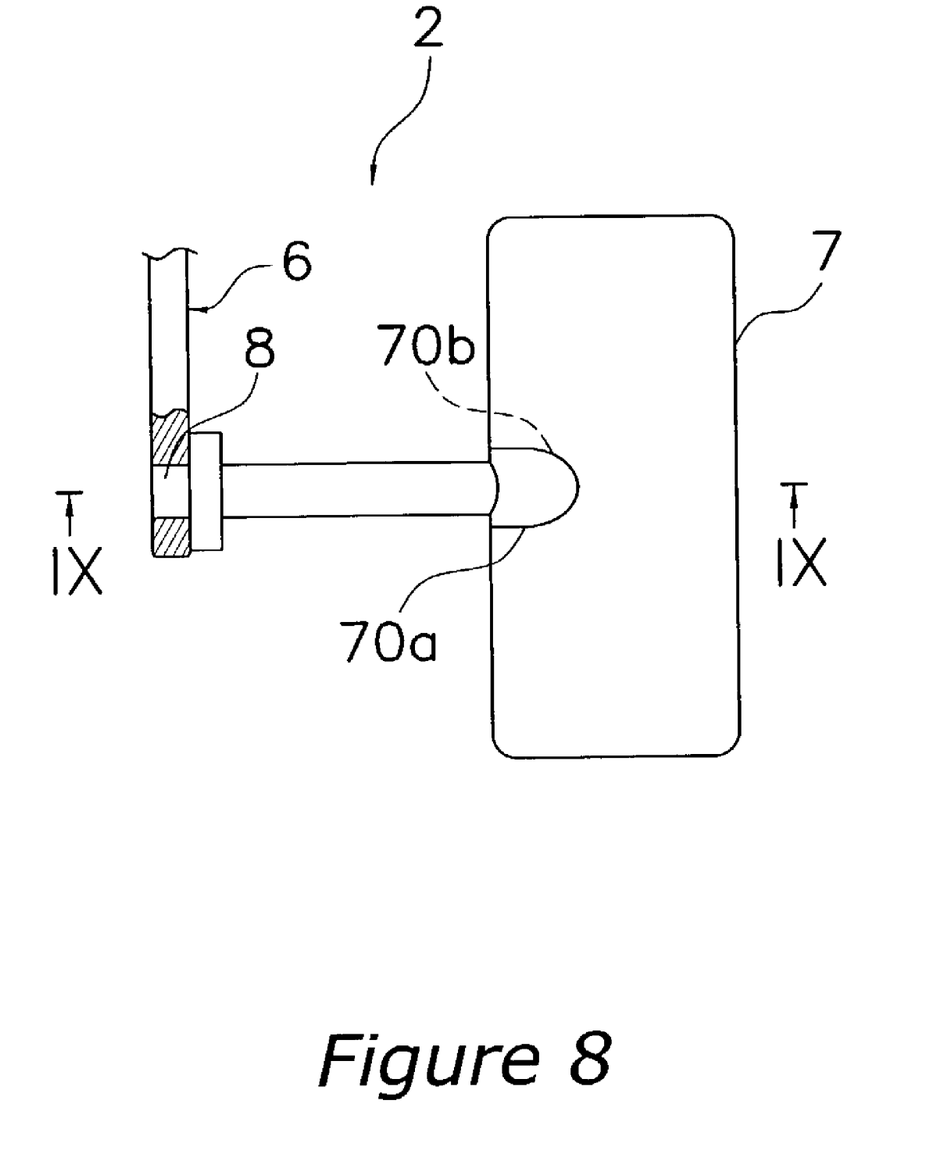
FIG. 8 is an enlarged view equivalent to FIG. 4 of the handle grip in accordance with an alternative embodiment of the present invention.
Figure 9:
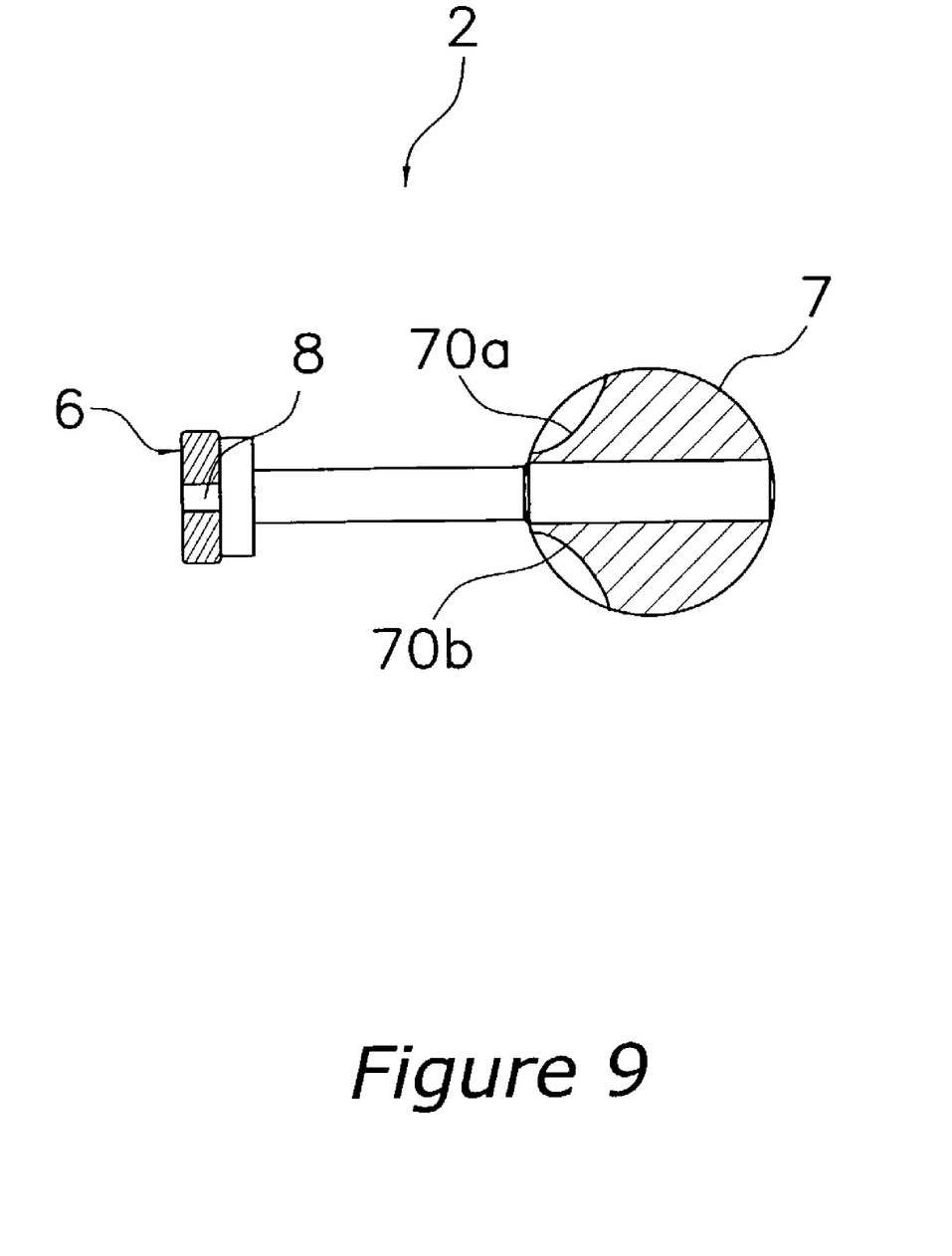
FIG. 9 is a cross-sectional view of the handle grip in accordance with the alternative embodiment of the present invention, viewed from line IX—IX in FIG. 8.

(b) In the foregoing embodiment, the contour of the handle grip 7 is formed to be substantially egg-shaped, but the shape is not limited thereto. The cross sectional shape of the handle grip may be formed to be substantially T-shaped, as shown in FIGS. 8 and 9.

(c) In the foregoing embodiment, the handle grip 7 is recessed with the first recess 70a to the fourth recess 70d. However, the shapes, locations, numbers or the like of the recesses may be determined freely. For example, as shown in FIG. 8, the first recess 70a and the second recess 70b may be formed in the vicinity of the portion of the handle grip 7 to which the rotation support portion 8 is mounted, such that the first recess 70a and the second recess 70b form symmetry with respect to the rotational axis 7a of the handle grip 7. This way, the user can perform high-speed winding by placing his fingertips on the first and second recesses 70a and 70b.

Figure 10:
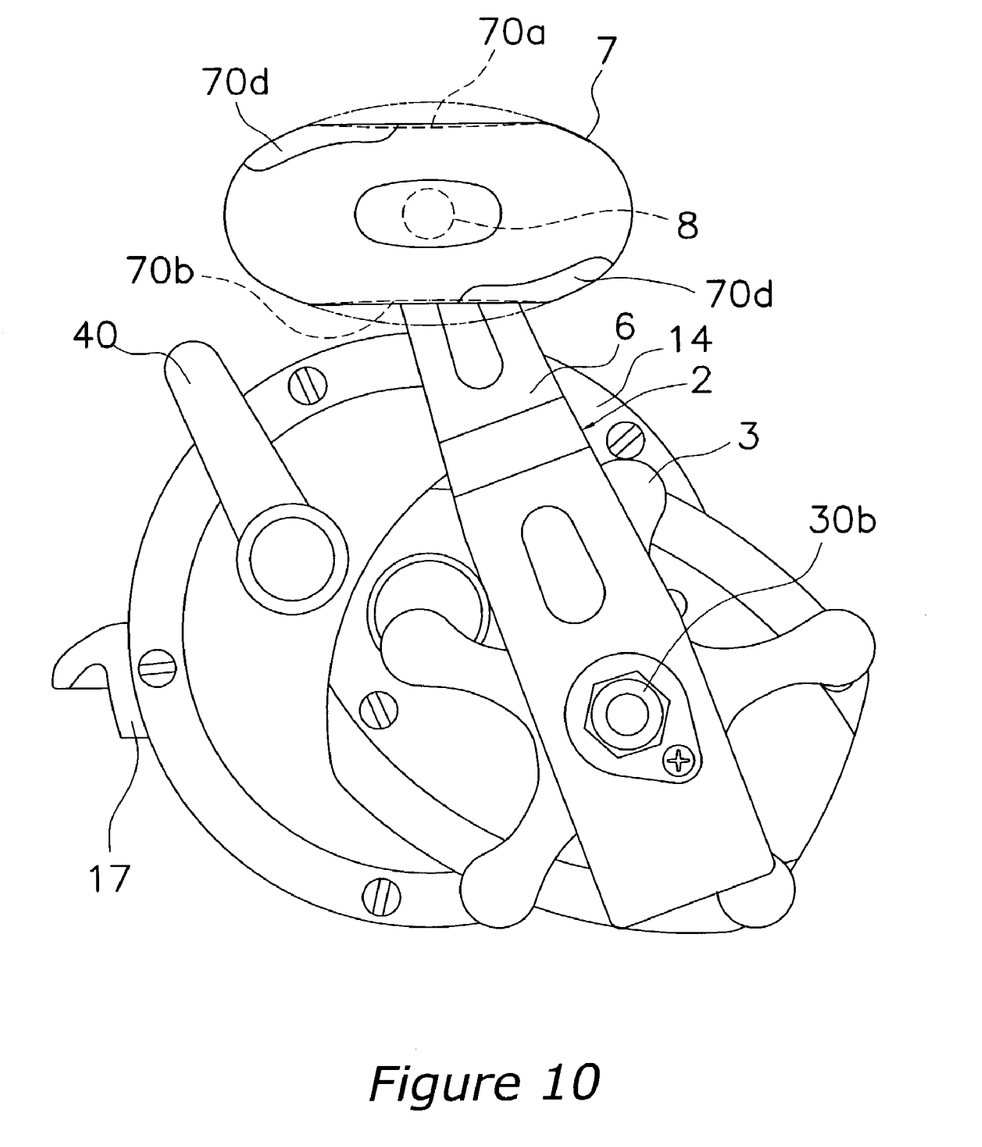
FIG. 10 is a side view of the dual-bearing reel, which is equivalent to FIG. 3, in accordance with another alternative embodiment of the present invention.
Figure 11:
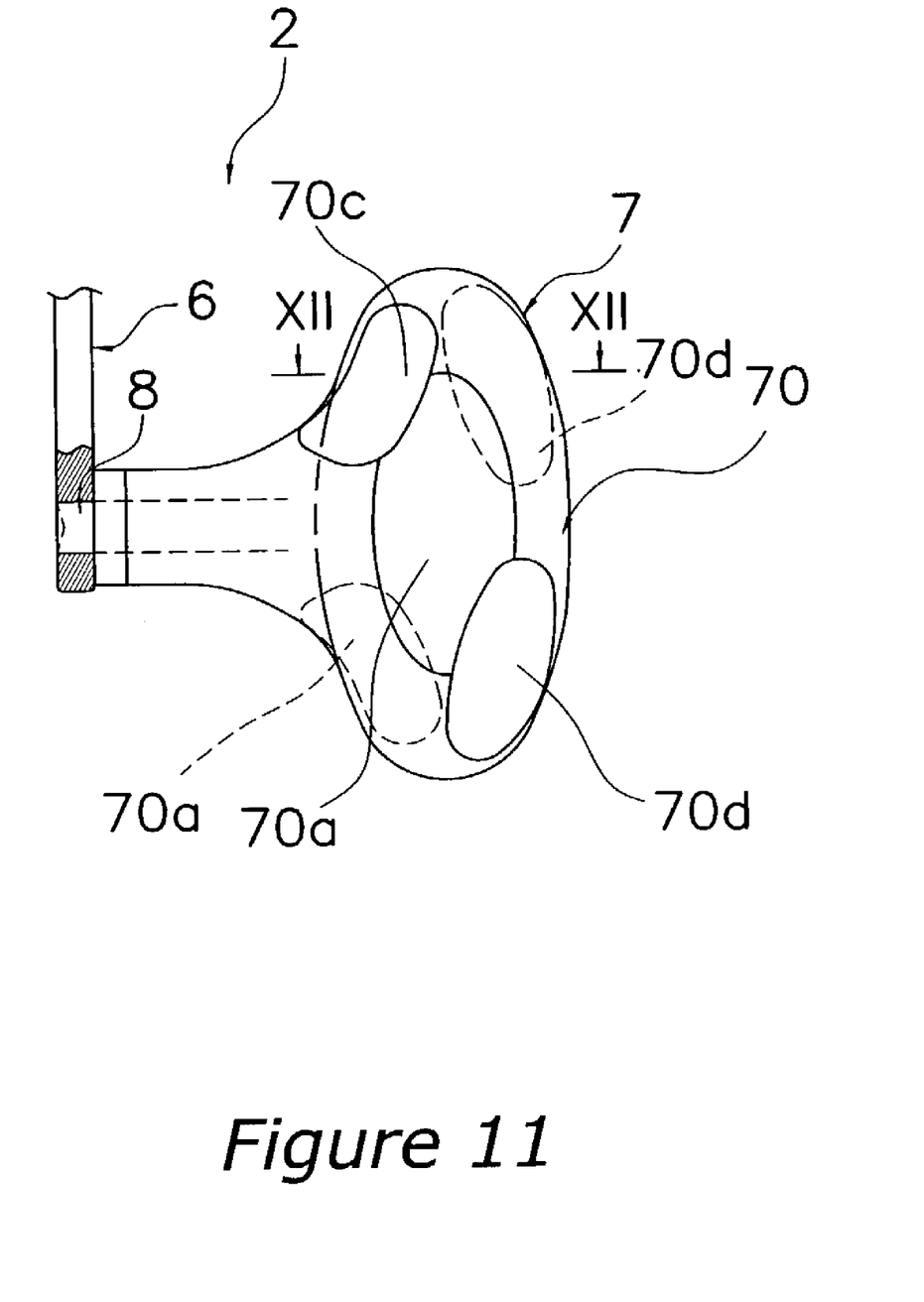
FIG. 11 is an enlarged view of the handle grip, which is equivalent to FIG. 4, in accordance with the embodiment of FIG. 10 of the present invention.
Figure 12:
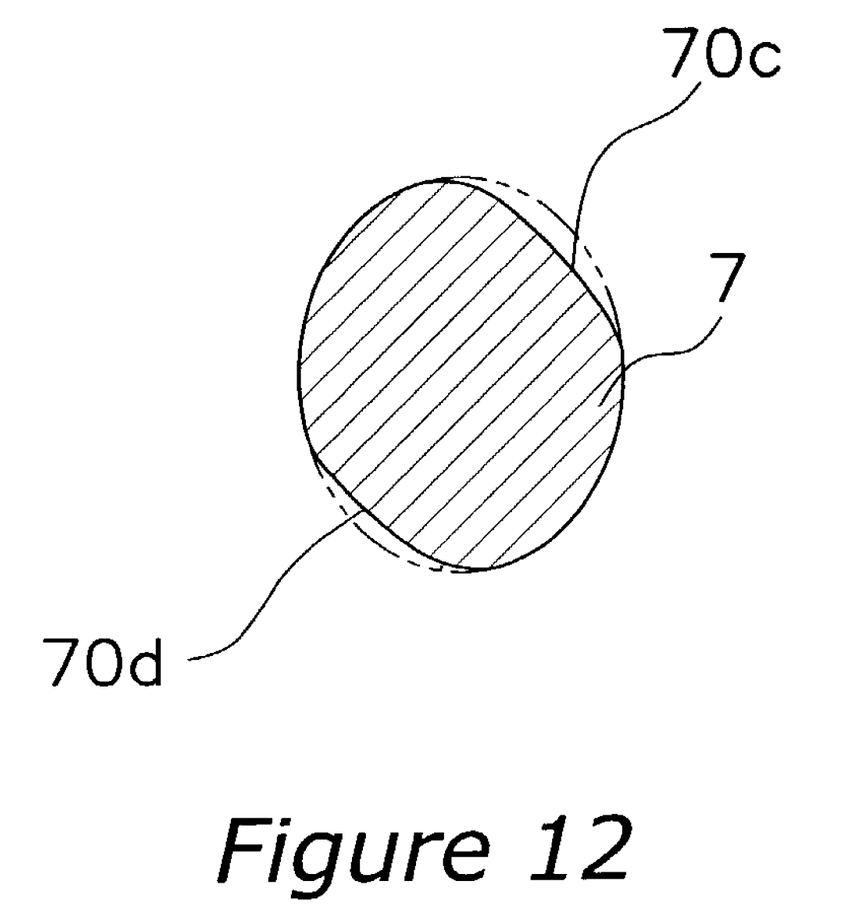
FIG. 12 is a cross-sectional view of the handle grip in accordance with the embodiment of FIG. 10 of the present invention, viewed from line XII—XII in FIG. 11.

(d) In the handle grip 7 of the forgoing embodiment, only one each of the third recess 70c, to which the thumb can be attached, and the fourth recess 70d, to which the thenar eminence can be attached, is provided. Alternatively, the handle grip 7 can have two each of the recesses 70c and 70d that are located symmetrically with respect to the rotational center of the handle grip 7, as shown in FIGS. 10–12. In this case, the user can operate the handle grip 7 easily even when the handle grip 7 is turned 180 degrees. Also in this embodiment, the recesses 70a and 70b are formed slightly recessed from the surface of the body portion. On the other hand, the recesses 70c and 70d are formed so as to form a continuous surface as shown in FIG. 12.

(e) The forgoing embodiment pertains to the handle assembly that is noncircularly engaged with the handle shaft. In stead, the handle assembly can be threadedly coupled to the handle shaft, so as to be detachable and reattachable from and to the reel unit. More particularly, the handle assembly can be mounted to the handle shaft via a non-circular nut and bore. Alternatively, the handle assembly can be mounted to the handle shaft by being threadedly coupled to the handle shaft. Particularly, in the case of a spinning reel, the handle assembly can be threadedly coupled to the master gear shaft.

With the present invention, the handle grip is formed in such a shape that the whole thereof is grippable with the human palm, while at the same time being recessed with recesses for being seized between the thumb and fingertips. Therefore, a user can easily perform high-speed winding by seizing the handle grip in the recesses with the thumb and fingertips.

As used herein, the following directional terms "forward," "rearward," "above," "downward," "vertical," "horizontal," "below" and "transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2002-134353. The entire disclosure of Japanese Patent Application No. 2002-134353 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A handle assembly for a fishing reel, the handle assembly being adapted to be mounted to a fore-end of a handle shaft of the fishing reel, said fishing-reel handle assembly comprising:
   a handle arm adapted to be mounted to the fore-end of the handle shaft;
   a rotation support portion rotatably mounted to a fore-end of said handle arm; and a handle grip non-rotatably mounted to said rotation support portion, said handle grip having
a body portion shaped such that a contour of said handle grip is substantially egg-shaped, wherein the user can hold said body portion with substantially the entire surface of a palm, and
a plurality of recesses formed on said body portion wherein the user can pinch at least two of said recesses between the thumb and a fingertip, said two recesses being formed in locations in said handle grip in symmetry with respect to a rotational axis of said handle grip.

2. The fishing-reel handle assembly as set forth in claim 1, wherein
at least one of said recesses of said handle grip is in the vicinity of a portion of said handle grip to which said rotation support portion is mounted.

3. The fishing-reel handle assembly as set forth in claim 1, wherein
said handle grip is formed such that a cross sectional shape of said handle grip is substantially T-shaped.

4. The fishing-reel handle assembly as set forth in claim 1, wherein
said two recesses are formed on opposite sides of said contour of said body portion, wherein the user can clamp said handle grip by attaching the thumb and the index finger to said two recesses to apply force thereto.

5. The fishing-reel handle assembly as set forth in claim 1, wherein
another of said recesses is formed on said body portion so as to be able to face said handle arm.

6. A fishing-reel handle assembly adapted to be mounted to a fore-end of a handle shaft of the fishing reel, said fishing-reel handle assembly comprising:
a handle arm adapted to be mounted to the fore-end of the handle shaft;
a rotation support portion rotatably mounted to a fore-end of said handle arm; and
a handle grip non-rotatably mounted to said rotation support portion, said handle grip having
a body portion shaped such that a contour of said handle grip is substantially egg-shaped, wherein the user can hold said body portion with substantially the entire surface of a palm, and
a recess formed on said body portion wherein the user can pinch said recess between the thumb and a fingertip,
wherein
said handle grip has another recess that is formed on an axial side of said body portion away from said rotation support portion and on a side closer to the user, wherein the user can grip said handle grip by attaching the thenar eminence to said recess on the side closer to the user to apply force thereto.

7. A fishing-reel handle assembly adapted to be mounted to a fore-end of a handle shaft of the fishing reel, said fishing-reel handle assembly comprising:
a handle arm adapted to be mounted to the fore-end of the handle shaft;
a rotation support portion rotatably mounted to a fore-end of said handle arm; and
a handle grip non-rotatably mounted to said rotation support portion, said handle grip having
a body portion shaped such that a contour of said handle grip is substantially egg-shaped, wherein the user can hold said body portion with substantially the entire surface of a palm, and
a recess formed on said body portion wherein the user can pinch said recess between the thumb and a fingertip,
wherein
said handle grip has another recess that is formed on an axial side of said body portion closer to said rotation support portion and on a side closer to the user, wherein the user can grasp said handle grip by attaching the thumb to said recess on the side closer to the user to apply force thereto.

8. A dual bearing reel, comprising:
a reel unit having
a pair of side plates disposed so as to have a predetermined gap therebetween,
a frame having a plurality of coupling members for coupling said side plates, and
a spool rotatively supported by said side plates for winding fishing line; and
a handle assembly disposed at one side of said reel unit for rotating said spool, said handle assembly including
a handle arm adapted to be mounted to the fore-end of a handle shaft;
a rotation support portion rotatably mounted to a fore-end of said handle arm; and
a handle grip non-rotatably mounted to said rotation support portion, said handle grip having
a body portion shaped such that a contour of said handle grip is substantially egg-shaped, wherein the user can hold said body portion with substantially the entire surface of a palm, and
a plurality of recesses formed on said body portion wherein the user can pinch at least two of said recesses between the thumb and a fingertip, said two recesses being formed in locations in said handle grip in symmetry with respect to a rotational axis of said handle grip.

9. The dual bearing reel as set forth in claim 8, wherein
at least one of said recesses of said handle grip is in the vicinity of a portion of said handle grip to which said rotation support portion is mounted.

10. The dual bearing reel as set forth in claim 8, wherein
said handle grip is formed such that a cross sectional shape of said handle grip is substantially T-shaped.

11. The dual bearing reel as set forth in claim 8, wherein
said two recesses are formed on opposite sides on said egg-shaped contour of said body portion, wherein the user can clamp said handle grip by attaching the thumb and the index finger to said two recesses to apply force thereto.

12. The dual bearing reel as set forth in claim 8, wherein
another of said plurality of recesses is formed on an axial side of said body portion away from said rotation support portion, to which the user attaches the thenar eminence so that the user can grip said handle grip.

13. The dual bearing reel as set forth in claim 12, wherein
another of said plurality of recesses is formed on an axial side of said body portion closer to said rotation support portion, to which the user attaches the thumb so that the user can grasp said handle grip.

14. The dual bearing reel as set forth in claim 8, wherein
another of said recesses is formed on said body portion so as to be able to face said handle arm.

* * * * *